C. J. PRIESTER.
PRESS FOR MOLDING DOLLS AND OTHER PLASTIC ARTICLES.
APPLICATION FILED MAY 18, 1920.
1,368,836.
Patented Feb. 15, 1921.
3 SHEETS—SHEET 1.
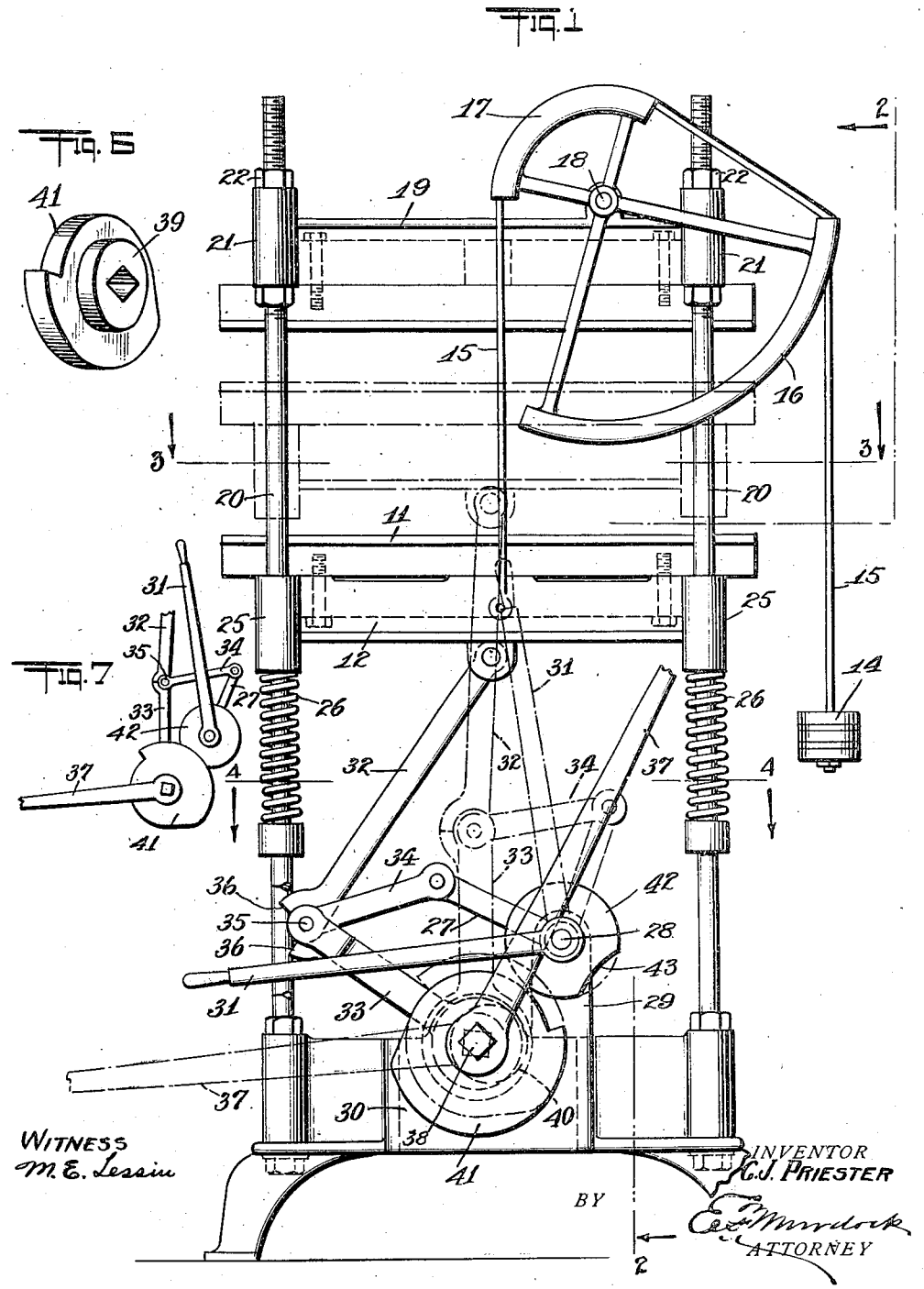

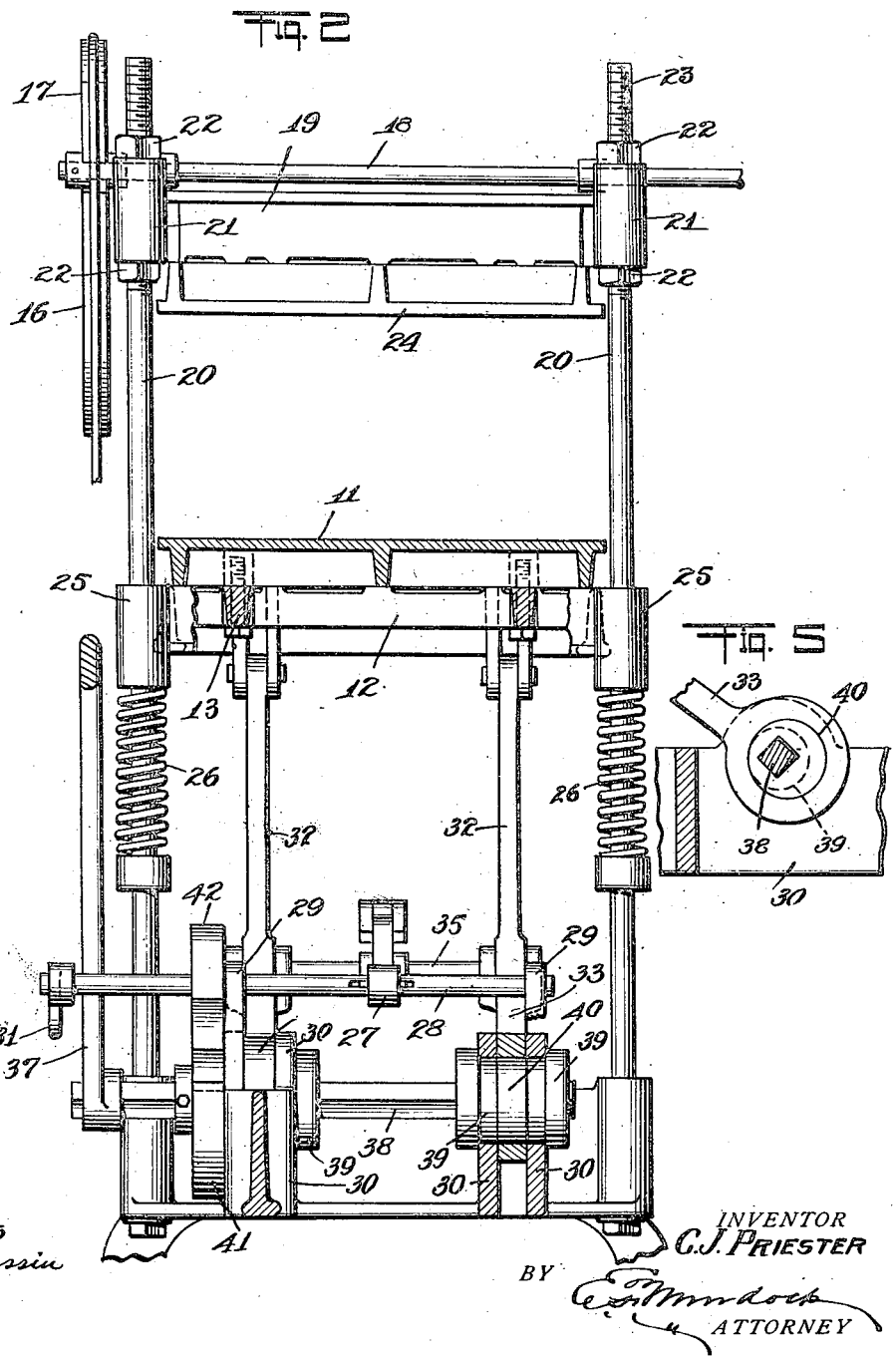

C. J. PRIESTER.
PRESS FOR MOLDING DOLLS AND OTHER PLASTIC ARTICLES.
APPLICATION FILED MAY 18, 1920.
1,368,836.
Patented Feb. 15, 1921.
3 SHEETS—SHEET 3.
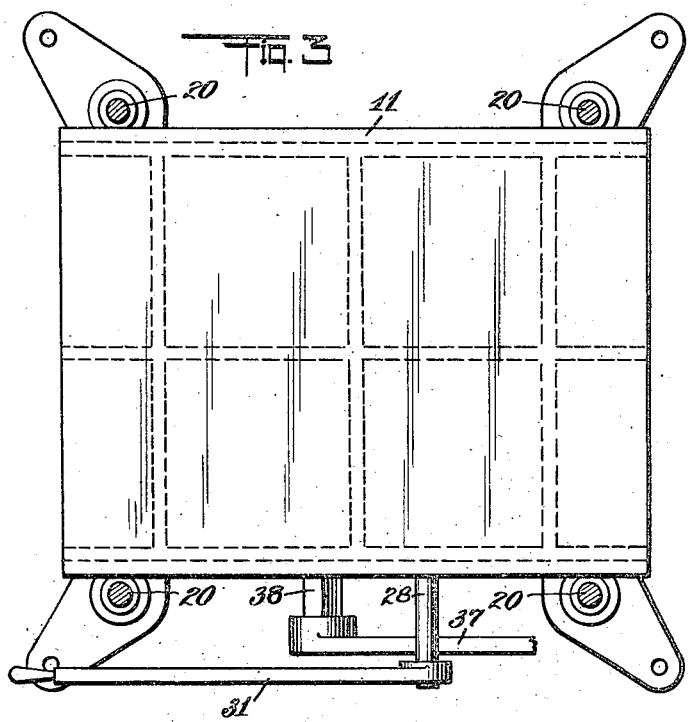
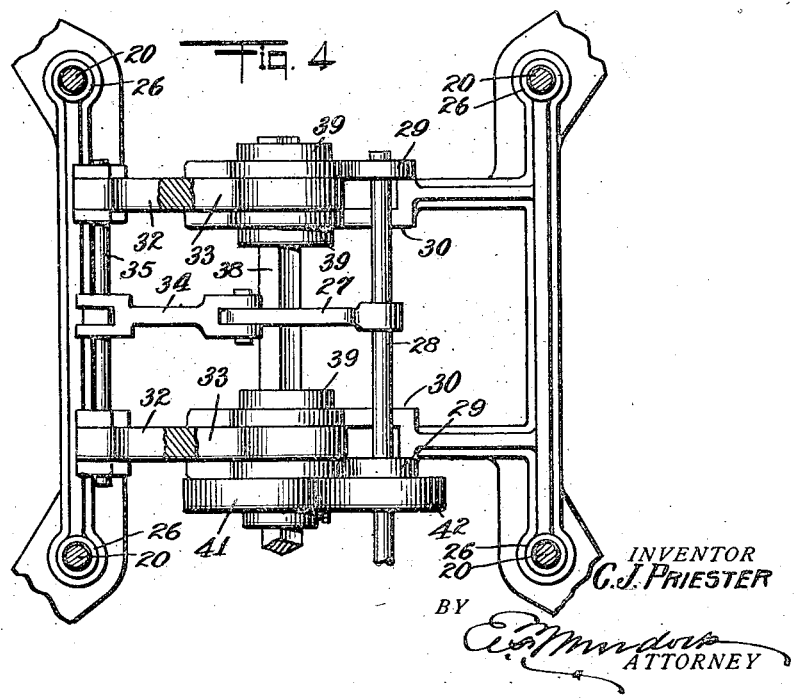
WITNESS
M. E. Lessin
INVENTOR
C. J. PRIESTER
BY
ATTORNEY

UNITED STATES PATENT OFFICE.

CHARLES J. PRIESTER, OF HACKENSACK, NEW JERSEY.

PRESS FOR MOLDING DOLLS AND OTHER PLASTIC ARTICLES.

1,368,836.     Specification of Letters Patent.     Patented Feb. 15, 1921.

Application filed May 18, 1920. Serial No. 382,256.

*To all whom it may concern:*

Be it known that I, CHARLES J. PRIESTER, a citizen of the United States, and a resident of Hackensack, in the county of Bergen and State of New Jersey, have invented certain new and useful Improvements in Presses for Molding Dolls and other Plastic Articles, of which the following is a full, clear, and exact description.

Among the principal objects which the present invention has in view are: to expedite the closing of widely opening power presses; to balance the pressure on the platen; to lock the moving members of a press; and to simplify the construction.

Drawings.

Figure 1 is a side elevation of a press constructed and arranged in accordance with the present invention;

Fig. 2 is a vertical section of the same, the section being taken as on the line 2—2 in Fig. 1;

Fig. 3 is a horizontal section of the same, the section being taken as on the line 3—3 in Fig. 1;

Fig. 4 is a horizontal section, the section being taken as on the line 4—4 in Fig. 1;

Fig. 5 is a detail view showing a fragment of the eccentric mounting for the toggle links;

Fig. 6 is a detail view in perspective of one of the journal bearings and the locking disk operatively connected with the power shaft of the press.

Fig. 7 is a detail view on reduced scale showing the closing levers and the power lever and the interlocking disks connected therewith, the parts being shown in the locked position of the press.

Description.

The press herein disclosed is particularly adapted for use in pressing molds containing material from which are formed heads or other parts of dolls. The press may, however, be employed for other uses, notably for pressing hats, where it is desired that the platen or molds carried thereon shall be widely opened for convenience of manipulation, and quickly closed from the fully opened position to the position where pressure is to be applied.

In the present invention the platen 11 is bolted to the bed 12 by means of fastening bolts 13. The bed 12 is counter-balanced by weights 14, which are suspended by a suitable cable 15, that is passed around the quadrants 16 and 17. The quadrants 16 and 17 are concentric, and form different diameters, the former being the longer and the latter the shorter diameter. By this arrangement a relatively light weight may be applied for the purpose of lifting the bed 12 and platen 11 with any weight or articles placed thereon, the power being multiplied through the quadrants 16 and 17. The quadrants 16 and 17 are structurally united, and are rotatably mounted on the shaft 18, which extends across and is mounted in bearings in the head 19.

The head 19 is supported on corner posts 20 having sockets 21, which slide over the said posts, and nuts 22 which engage the threaded ends 23 of the said posts, so that the head may be adjusted vertically to increase or diminish the opening distance between the bed 12 and head 19, or between the platens 11 and 24.

The posts 20 serve as guides for the bed 12, the sockets 25 extended from the said bed sliding freely over the said posts. The bed and parts associated therewith are normally supported by the springs 26, and the counter-weight 14. It is intended that the springs 26 and counter-weight 14 shall slightly over-balance the weight of the said bed and parts, so that normally the bed is supported after pressure has been removed therefrom.

To depress the bed is the office of the arm 27, which is mounted on the rocking shaft 28. As seen best in Fig. 2 of the drawings, the rocking shaft 28 is mounted in bearings formed in standards 29 erected on the cross braces of the frame, and on the boxes 30 formed therein. At the outer extremity of the shaft 28 is the opening and closing lever 31. The lever 31 is employed to rock the shaft 28 and the arm 27 connected therewith. The arm 27 is operatively connected to the toggle levers 32 and 33, by means of the link 34. The link 34 is connected with the levers 32 and 33 at the breaking connection thereof, by means of the shaft 35. The levers 32 and 33 have each a square shouldered bracket 36, which brackets engage when the levers 32 and 33 are in the alined position shown by broken lines in Fig. 1 of the drawings, and thereby arrest any continued movement of the said levers rearwardly.

In the operation of the press, power is applied to the bed 12 and parts associated therewith through the levers 32 and 33, only when the same are in the alined position shown by the broken lines in Fig. 1. To this end the power lever 37 is rigidly connected with the square shaft 38, on which, as seen best in Fig. 5 of the drawings, are rigidly mounted eccentric disks 39, which fit the collars 40 at the ends of the toggle levers 33. The disposition of the disks 39 on the shaft 38 is such that when the lever 37 is in the position shown in Fig. 1 of the drawings, the longer radii of the disk are disposed horizontally, or extended away from the butt ends of the levers 33, where they join the collars 40. In this position of the disk 39 and the levers 32, 33, power is removed from the bed 12, and platen 11. When however, the lever 37 is rocked forwardly, to a position where the end of the said lever rests adjacent the floor on which the press stands, slightly more than a quarter revolution of the shaft 38 occurs, and the disks 39 are then disposed so that the long radii of the said disks are in line with the levers 33 and 32, when arranged as in service, or when power is being applied.

In presses of this character serious difficulty has been experienced, and accidents have occurred, caused by the opening of the toggle levers 32, 33, prior to removing the pressure from the bed. The opening of the said levers has occurred sometimes accidentally, and sometimes through carelessness, the operator hastily opening his press before removing the pressure therefrom.

It is obvious that should the levers 32, 33 be opened while pressure is applied, the whole force of the pressure would be transmitted to the lever 31, which would whip to the open position with a force liable to damage the machine or attendant in charge thereof. It is to prevent any such accidents that I provide the disks 41 and 42. The disk 41 is mutilated, one portion of the said disk having one radius, and another portion of the said disk having a different radius. The portion of the disk 41 having the shorter radius corresponds and coöperates with the portion of the disk 42 having a larger radius. The disk 42 has a curved recess 43, the courvature whereof conforms with the curvature of the larger portion of the disk 41, the perimeter of which engages and moves in contact with the surface of the recess 43 when the levers 32 and 33 are moved to their alined or power position.

It is obvious that when the disks 41 and 42 are disposed as shown in Fig. 7 of the drawings, the disk 42 and parts associated therewith may not be moved, and the shaft 28 cannot be rocked without first moving the disk 41 to the position shown in Fig. 1 of the drawings. This insures that the power applied to the bed 12 shall be removed before the toggle levers 32 and 33 can be opened, and thus accident or damage is avoided.

When operating the press herein disclosed, the operator first opens the press by moving the lever 31 to the position shown in Fig. 1 of the drawings. The platen 11 is then loaded with the molds from which the doll parts are constructed, and the lever 31 is then lifted to the position shown by broken lines in Fig. 1 of the drawings. In this position the toggle levers 32, 33, are alined and ready to transmit power to the bed 12. The lever 37 is then engaged by the operator and the shaft 38 is rocked until the lever 37 is in its full-power position, where the long radius of the disk 39 is parallel with the levers 32 and 33.

In rocking the shaft 38 to the position just described, the portion of the disk 42 which has the larger radius moves into line with the recess 43, and engages the surface of the recess to thereafter prevent the rotation of the disk 42 or of the shaft 28 connected therewith. In other words, the disk 41 serves as a complete lock for the disk 42 and shaft 28.

It will be noted that the bed 12 is guided and supported by the four posts 20, which permits the equalization of the power pressure over the entire bed and over the platen 11 disposed thereon. This construction and arrangement gives an even distribution of the power to all of the articles mounted on the said bed and platen.

*Claims.*

1. A press as characterized comprising a rapid acting mechanism for closing the press, and a slow acting mechanism for applying power to said press; and means for locking the first mentioned mechanism during the operation of the second mechanism.

2. A press as characterized comprising a rapid acting mechanism for closing the press, and a slow acting mechanism for applying power to said press; and means for locking the first mentioned mechanism during the operation of the second mechanism, said means embodying a plurality of mutilated disks, each rigidly attached to a rotary part of one of said mechanisms, the portions of each of said disks having the longer radii of each of said disks engaging the mutilated portion of the other of said disks to move freely therethrough while forming an obstruction to the movements of the other of said disks.

3. A press as characterized comprising a rectangular head; a plurality of mounting posts therefor, each of said posts being secured to said heads at one of the corners thereof; a platen corresponding in shape to said head and slidably engaging all of said posts to be guided thereby; a counter-balancing mechanism mounted on said head for modifying the resistance of said platen to the lifting movement when closing said platen toward said head; and power mechanism for lifting said platen under power toward said head to equalize the pressure on said platen throughout its area.

4. A press as characterized comprising a rectangular head; a plurality of mounting posts therefor, each of said posts being secured to said heads at one of the corners thereof; a platen corresponding in shape to said head and slidably engaging all of said posts to be guided thereby; a counter-balancing mechanism mounted on said head for modifying the resistance of said platen to the lifting movement when closing said platen toward said head; and power mechanism for lifting said platen under power toward said head to equalize the pressure on said platen throughout its area; a closing mechanism operable independently of said power mechanism; and means connecting said power mechanism and said closing mechanism for locking the closing mechanism in closed position during the operation of said power mechanism.

5. A press as characterized comprising a rectangular head; a plurality of mounting posts therefor, each of said posts being secured to said heads at one of the corners thereof; a platen corresponding in shape to said head and slidably engaging all of said posts to be guided thereby; a counter-balancing mechanism mounted on said head for modifying the resistance of said platen to the lifting movement when closing said platen toward said head; an operating mechanism for said platen embodying a plurality of toggle levers for opening and closing said platen upon said head; a power shaft operatively connected with certain of said levers for lifting said levers in the line of their alined extension; a mutilated disk operatively connected with said levers for movement coincident therewith; a locking disk mounted on said power shaft for rotation therewith, said locking disk being adapted for engaging said mutilated disk and the mutilated section thereof, to prevent any movement of said mutilated disk and parts associated therewith during the application of power to said platen by said shaft and parts associated therewith.

6. In presses as characterized having a closing mechanism and a power applying mechanism; a plurality of coöperating locking disks operatively disposed for mutual engagement, each of said disks having a recess for permitting the passage therethrough of the other of said disks.

7. In presses as characterized having a rapid closing mechanism and a power mechanism, each of said mechanisms having an operating shaft, said shaft being disposed in parallel spaced relation; a coöperative locking mechanism comprising a plurality of mutilated disks, each of said disks being mounted on one of said shafts, and each provided with recesses adapted to receive a portion of the other disk, which portions when disposed in said recesses prevent the rotation of the disk having the recess.

CHARLES J. PRIESTER.